Inventor
WILLIAM H. KETNER

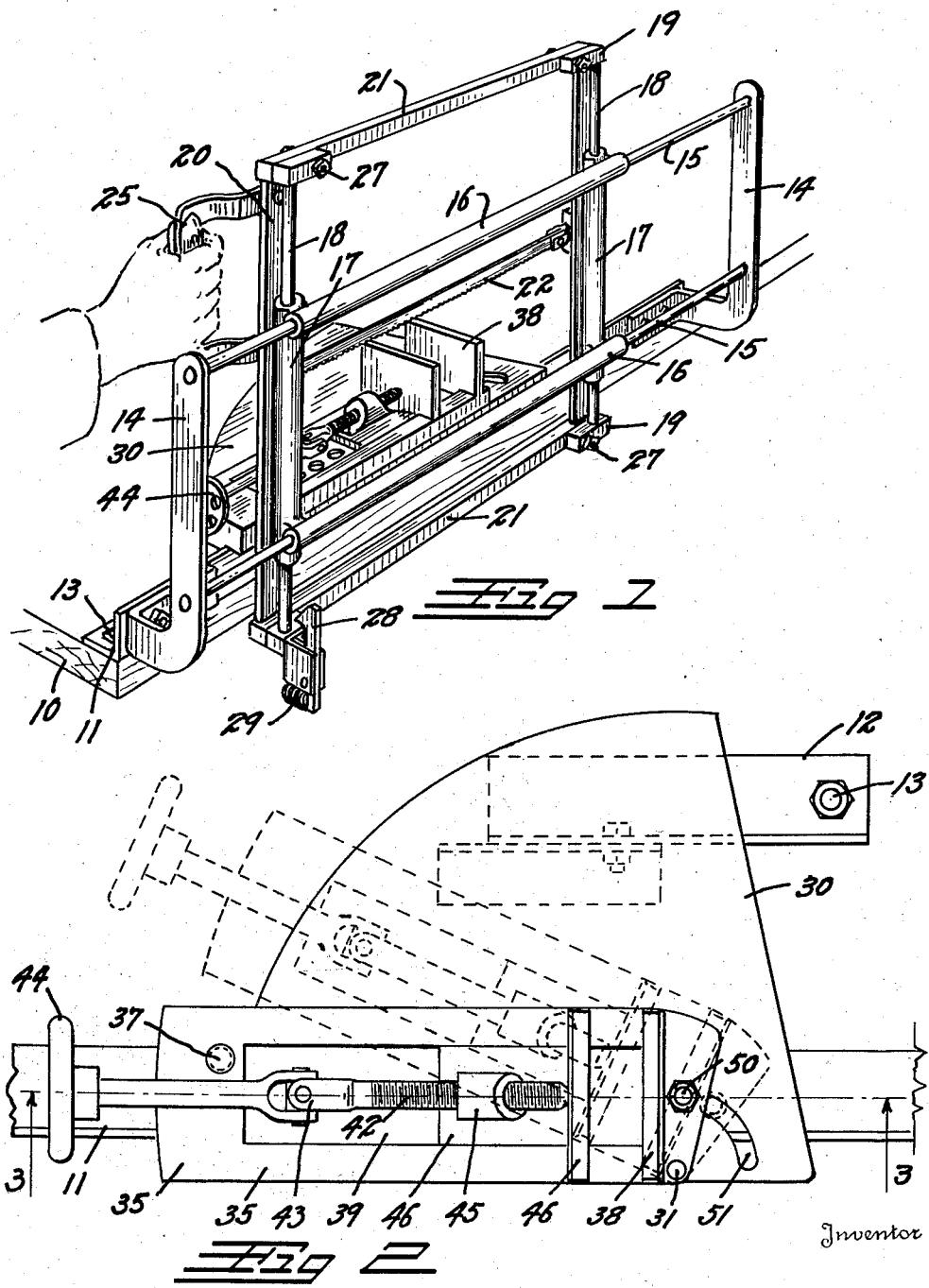

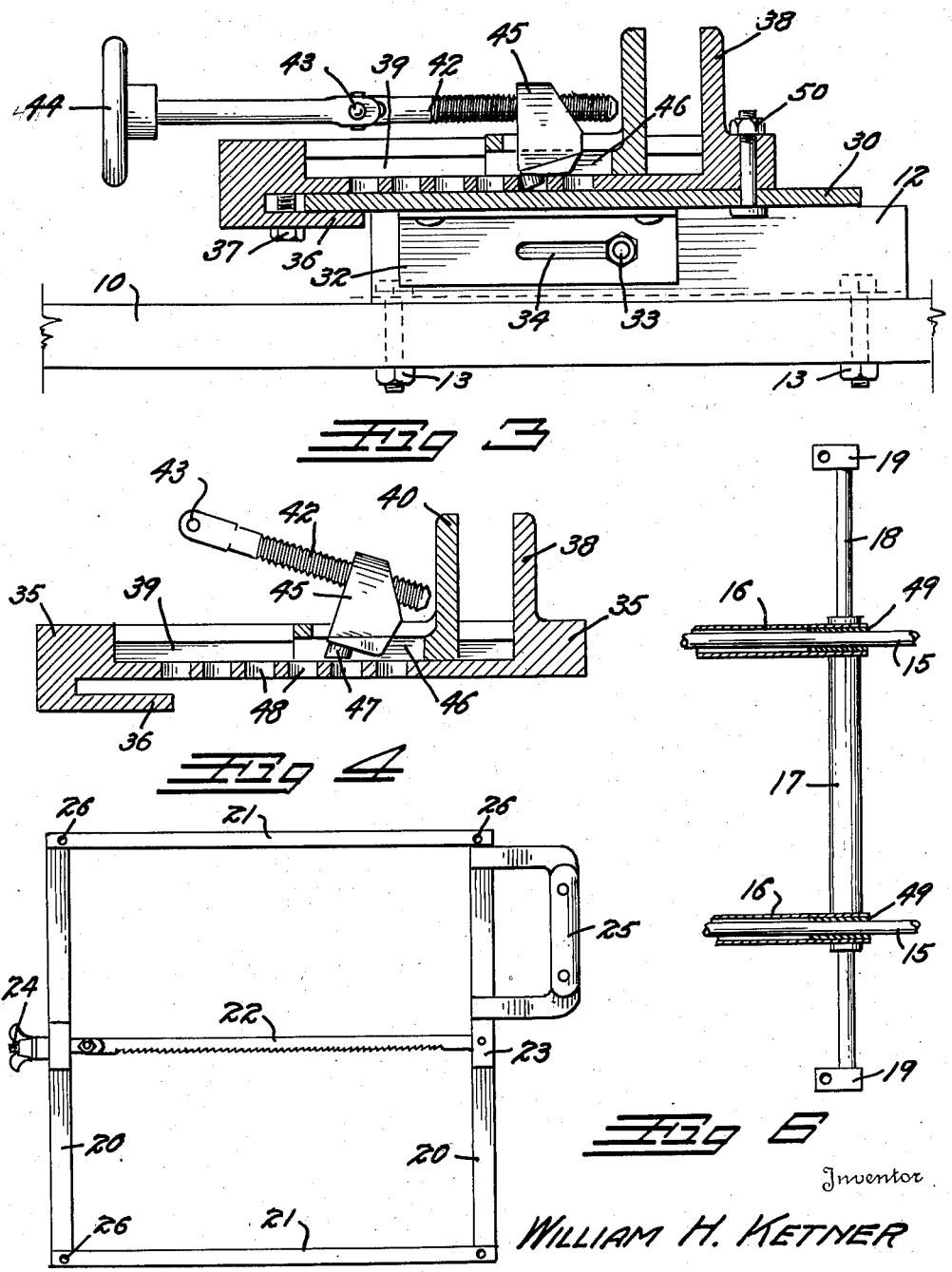

Patented June 11, 1935

2,004,286

UNITED STATES PATENT OFFICE 2,004,286

HACK SAW FRAME AND GUIDE

William H. Ketner, Broomfield, Colo.

Application April 3, 1934, Serial No. 718,808

7 Claims. (Cl. 29—75)

This invention relates to a hack saw frame and has for its principal object the provision of a device which will accurately guide the saw and accurately hold the work at the desired angle to be sawed. Other objects of the invention are to provide an adjustable saw table which will allow work of any width to be properly positioned with relation to the saw so as to obtain a maximum saw stroke; to provide quick acting means for clamping the work in place; to provide means for holding the saw in the elevated position while the work is being adjusted; and to provide means for holding the saw so constructed that the tension placed upon the saw will not effect the sliding or movable parts of the device.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

Fig. 1 is a perspective view illustrating the device ready for use.

Fig. 2 is a plan view of the work table employed therein.

Fig. 3 is a longitudinal section through the work table, taken on the line 3—3, Fig. 2.

Fig. 4 is a similar section through the work table illustrating the vice nut member in the released position.

Fig. 5 is a detail face view of the saw frame removed from the remainder of the device.

Fig. 6 is a detail view illustrating the bearings for lateral movement of the saw frame.

Figure 7:
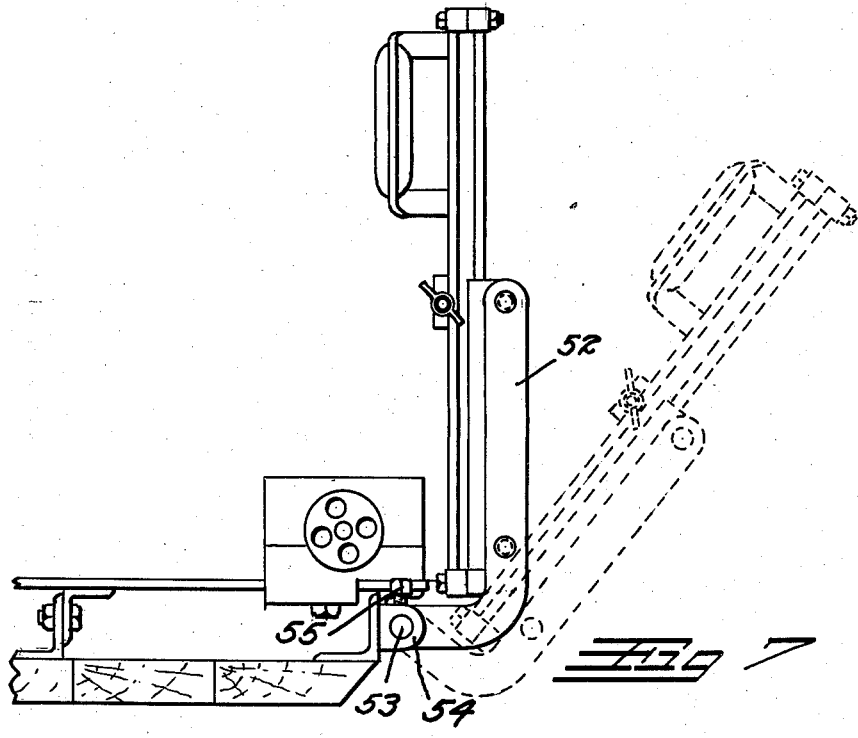
Fig. 7 is an end elevation of an alternate form of support for the invention.
Figure 8:
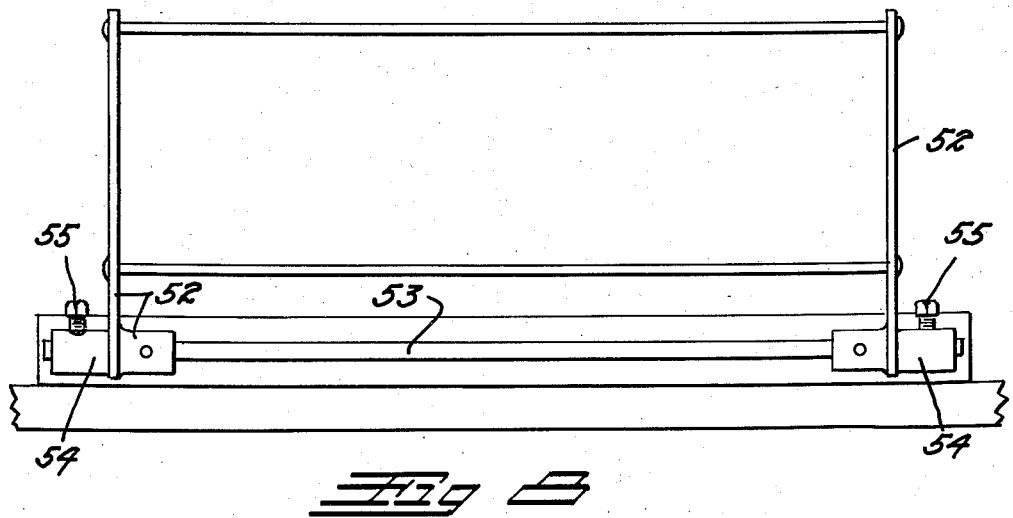
Fig. 8 is a face view of the supporting frame of the alternate form.

The invention is designed for attachment to the edge of a work bench or any other suitable supporting structure, such as indicated at 10.

The invention comprises a main base angle 11 and a second base angle 12. The base angles 11 and 12 are arranged for attachment to the supporting structure 10 by means of suitable attachment bolts 13. A pair of standards 14 project outwardly and upwardly from the base angle 11 and support two parallel, horizontal guide rods 15. The rods 15 are positioned in a common vertical plane, and are designed to receive and guide a sliding frame.

The sliding frame consists of two horizontal tubular members 16 which slide upon the rods 15 and two vertical tubular members 17 which are rigidly secured to the horizontal members 16. Each of the members 17 receives a vertical slide bar 18, the extremities of which are provided with attachment heads 19 for receiving a saw frame.

A saw frame consists of a rigid, rectangular structure, as illustrated in Fig. 5, having vertical side bars 20 and horizontal top and bottom bars 21. The bars 20 and 21 are rigidly secured together so as to constantly maintain their rectangular relation. A saw 22 extends horizontally across the saw frame substantially at its middle, from an attachment clip 23 to a tension screw 24 and a suitable hand grip 25 is provided on one of the uprights 20. Bolt holes 26 are formed in the frame through which attachment bolts 27 may be passed into the heads 19 of the vertical slides 18. A latch member 28 is provided and actuated by means of a spring 29 so that it will snap over the lower tube 16 when the saw is in its extreme elevated position so as to hold the saw suspended when not in use.

It can be readily seen that the horizontal rods 15 will accurately guide the saw in its proper horizontal travel and that the vertical rods 18 sliding in the tubes 17 will accurately guide the saw in its vertical travel. It is preferred to provide the tubes 16 and 17 with bearing bushings 49 at their extremities, as shown in Fig. 6, so that the frictional contact with the guide rods 15 and 18 will be limited to the extremities of the tube so as to eliminate binding on the bars and reduce the frictional contact as much as possible. These bushings are also very economical to renew when they become worn.

A work table 30 is provided for supporting the work to be sawed. This table has an arcuate contour about a pivot pin 31. It is secured in place by means of attachment angles 32 which engage the faces of the base angles 11 and 12. The attachment angles are secured to the base angles by means of suitable clamp bolts 33 positioned in elongated slots 34 in the angles 32. By this arrangement the work table 30 may be slid parallel to the saw to any desired position.

A work vise is pivoted upon the table 30 upon the pivot pin 31. This vise consists of a vise frame 35 provided with a suitable opening for receiving the pivot pin 31 and with an inwardly turned lip 36 for engaging the bottom of the table 30. A clamp screw 37 is employed for clamping the lip 36 against the bottom of the table at the desired adjusted position. The frame 35 is formed with a fixed vise jaw 38 and contains a shouldered channel 39.

A movable jaw 40 travels in the shouldered channel 39. The movable jaw is actuated by means of a vise screw 42, connected through a suitable universal joint 43 with a vise handle 44. The vise screw 42 is threaded through an adjustable nut member 45 which is mounted in a shouldered channel 46 in the base of the movable jaw 40. The nut member 50 is provided with a dowel 47 which can be brought to engagement with any one of a series of holes 48 in the bottom of the frame member 35. A clamp bolt 50 extends through the vise frame 35 into an arcuate slot 51 in the table 30. This bolt is employed for clamping the device in the desired adjusted position.

In use, the movable jaw is withdrawn from the fixed jaw 38 by lifting the vise screw 42, as shown in Fig. 4, to release the dowel 47. The work is then placed against the fixed jaw. The dowel is then engaged in the nearest convenient hole 48 and the screw is tightened to clamp the work between the jaws. The table is now adjusted by means of the clamp bolts 33 to bring the mid-point of the work to the mid-point of the horizontal guide rods 15 so that a maximum saw stroke may be obtained. If it is desired to cut the work on a bevel, the clamp screws 37 and 50 are loosened and the vise frame 35 is swung to the proper angle. The clamp bolts are then again tightened to firmly clamp the device in place. The saw is then released by releasing the latch 28 and is given a reciprocatory movement by means of the hand hold 25 until the desired sawing operation has been completed. The saw must saw the desired cut since it is accurately guided in its vertical plane.

It is desired to call attention to the fact that the saw frame is independent of the guide frame so that the tension placed in the saw will not affect or bind the sliding movement.

The universal joint 43 allows the vise screw to be conveniently operated from any angle or position and allows the hand wheel 44 to be swung out of the way of the hand hold 25. The weight of the saw frame is sufficient to apply the proper pressure for the usual sawing operation. If additional pressure is desired, it may be applied with the operator's other hand upon the top of the saw frame.

In Fig. 7, an alternate form of the invention is illustrated with which a vertically inclined saw cut may be made. This form is similar to the previously described form except for the fact that the horizontal guide rods are mounted in end standards 52 which are permanently secured upon a connecting shaft 53. The shaft 53 is mounted in a pair of journal blocks 54. This construction allows the entire saw frame and its guiding structure to be swung inwardly or outwardly to any desired vertical angle. It can be locked at the required angle by means of suitable set screws 55 in the blocks 54 or in any other desired manner.

The alternate form of the invention is especially valuable for cutting V-shaped notches such as employed in the bending of angle iron frames etc.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. Means for guiding a hack saw comprising: a pair of horizontal guide rods; means for supporting said rods in a vertical plane; horizontal tubular members slidably mounted on said rods; vertical tubular members secured to said horizontal tubular members; vertical guide rods slidably mounted in said tubular members; a saw frame for supporting said hack saw; and means for securing said saw frame to said vertical guide rods.

2. Means for guiding a hack saw comprising: a pair of horizontal guide rods; means for supporting said rods in a vertical plane; horizontal tubular members slidably mounted on said rods; vertical tubular members secured to said horizontal tubular members; vertical guide rods slidably mounted in said tubular members; a saw frame for supporting said hack saw; means for securing said saw frame to said vertical guide rods; and a latch member adapted to support said saw frame in its elevated position.

3. In a hack sawing device having a horizontally movable, sliding frame, means for securing a saw to said frame comprising: vertical slide rods arranged to slide vertically through said sliding frame; a saw frame consisting of vertical and horizontal members rigidly secured together to form an open frame; means for suspending a saw across said frame; and means for attaching said saw frame to said vertically slide rods.

4. In a hack sawing device having a horizontally movable, sliding frame, means for securing a saw to said frame comprising: vertical slide rods arranged to slide vertically through said sliding frame; a saw frame consisting of vertical and horizontal members rigidly secured together to form an open frame; means for suspending a saw across said saw frame; means for attaching said saw frame to said vertical slide rods; and a hand hold formed on and projecting from said saw frame.

5. A hack saw device comprising: a base member; standards projecting outwardly and upwardly from said base member to one side thereof; horizontal parallel bars extending between said standards, said horizontal bars lying in a common vertical plane; horizontal tubular members slidably mounted on said horizontal bars; vertical tubular members secured to and extending between said horizontal tubular members; vertical rods slidably mounted in said vertical tubular members; and a frame for supporting a hack saw, said frame being secured to said vertical rods.

6. A hack saw device comprising: a base member; L-shaped standards extending forwardly and upwardly from said base member; horizontal parallel rods extending between the upwardly extending portions of said standards; a horizontal tube slidably mounted on each of said horizontal rods; vertical tubes rigidly connecting said horizontal tubes; vertical rods slidably carried in said vertical tubes; a saw frame connected to the extremities of said vertical rods, said saw frame being positioned between said base member and said horizontal rods; and means for mounting a saw in said saw frame.

7. A hack saw device comprising: a base member; L-shaped standards extending forwardly and upwardly from said base member; horizontal parallel rods extending between the upwardly extending portions of said standards; a horizontal tube slidably mounted on each of said horizontal rods; vertical tubes rigidly connecting said horizontal tubes; vertical rods slidably carried in said vertical tubes; a saw frame connected to the extremities of said vertical rods, said saw frame being positioned between said base member and said horizontal rods; means for mounting a saw in said saw frame; and means for hinging the lower extremities of said L-shaped standards to said base member.

WILLIAM H. KETNER.